US007282237B2

(12) United States Patent
Derand et al.

(10) Patent No.: US 7,282,237 B2
(45) Date of Patent: Oct. 16, 2007

(54) METHOD FOR SURFACE MODIFICATION, A NOVEL SUPPORT MATRIX AND THE USE OF THE MATRIX

(75) Inventors: Helene Derand, Taby (SE); Jan Nasman, deceased, late of Alunda (SE); by Rose Nasman, legal representative, Vasa (FI); by Harry Nasman, legal representative, Vasa (FI)

(73) Assignee: GE Healthcare Bio-Sciences AB, Uppsals (SE)

( * ) Notice: Subject to any disclaimer, the term of this patent is extended or adjusted under 35 U.S.C. 154(b) by 243 days.

(21) Appl. No.: 11/224,550

(22) Filed: Sep. 12, 2005

(65) Prior Publication Data

US 2006/0020087 A1    Jan. 26, 2006

Related U.S. Application Data

(63) Continuation of application No. 09/979,442, filed as application No. PCT/EP2000/005193 on Jun. 6, 2000, now abandoned.

(30) Foreign Application Priority Data

Jun. 9, 1999    (SE) .................................. 9902133

(51) Int. Cl.
  *B05D 7/24*   (2006.01)
  *B32B 27/30*  (2006.01)
  *C08F 8/00*   (2006.01)
  *C08F 12/08*  (2006.01)
  *C08F 16/06*  (2006.01)

(52) U.S. Cl. ...................... 427/222; 427/220; 428/407; 525/328.8; 525/332.2; 525/385

(58) Field of Classification Search ...................... None
See application file for complete search history.

(56) References Cited

U.S. PATENT DOCUMENTS

| 2,806,844 | A |   | 9/1957  | Gerecht et al.   |        |
|-----------|---|---|---------|------------------|--------|
| 3,099,646 | A |   | 7/1963  | Scardiglia et al.|        |
| 3,472,766 | A |   | 10/1969 | Rosenbaum        |        |
| 4,118,347 | A |   | 10/1978 | Ishiguro et al.  |        |
| 4,612,224 | A |   | 9/1986  | Davis            |        |
| 4,668,709 | A |   | 5/1987  | Jones et al.     |        |
| 4,908,405 | A | * | 3/1990  | Bayer et al.     | 525/61 |
| 5,416,124 | A |   | 5/1995  | Stringfield      |        |
| 5,466,758 | A |   | 11/1995 | Yoon-Sik et al.  |        |
| 5,583,162 | A |   | 12/1996 | Li et al.        |        |
| 6,087,316 | A |   | 7/2000  | Watson et al.    |        |

FOREIGN PATENT DOCUMENTS

| FR | 2 355 860   | 1/1978 |
|----|-------------|--------|
| WO | WO 92/04384 | 3/1992 |
| WO | WO 95/33553 | 12/1995 |
| WO | WO 97/27226 | 7/1997 |

OTHER PUBLICATIONS

Meldal, Meth. Enzymol. 289 (1997) p. 83-104.
Barany et al., ACS Symp. Ser. 680 (poly(ethylene glycol) (1997) p. 239-264.
A. Wurtz, Ann. Chim. et Phys. 69 (1963), p. 317.
R.W. Body et al. in Encyclopedia of polymer science and engineering, John Wiley & Sons, Inc. 1986.
R.H. Whitmarsh, in Nonionic Surfactants: Polyoxyalkylene Block Copolymers, Ed. V.M. Nace, Marcel Dekker, New York, 1996.
Derand et al., J. Polym. Sci. Part A: Polym. Chem. 36(5) (1998) p. 803- ?.
Meldal, M., "Properties of Solid Supports", *Methods in Enzymology*, vol. 289, 1997, p. 83-104.
Barany, G., et al., "Poly (ethylene glycol)-Containing Supports for Solid-Phase Synthesis of Peptides and Combinatorial Organic Libraries", *American Chemical Society Symposium, Series 680*, 1997, p. 239-264.
Wurtz, A., "Mémoire Sur L'Oxyde D'Ethyléne et les Alcools Polyéthyleniques", *Annales de Chimie et de Physique*, vol. 69, 1863, p. 317-355.
Body, R., et al., "1,2-Epoxide Polymers—Polyether Elastomers", *Encyclopedia of Polymer Science and Engineering*, vol. 6, John Wiley & Sons, Inc., 1986, p. 307-322.
Whitmarsh, R., "Synthesis and Chemical Modification of Polyoxyalkylene Block Copolymers", *Nonionic Surfactants*, Ed. V. M. Nace, Marcel Dekker, New York, 1996, p. 1-30.
Dérand, H., et al., "Graft Copolymers Prepared by Ethoxylation of Polyamide 12 and Poly (ethylene-*co*-vinyl alcohol)", *Journal of Polymer Science*, vol. 36, 1998, p. 803-811.

* cited by examiner

*Primary Examiner*—Robert Sellers
(74) *Attorney, Agent, or Firm*—Yongggang Ji

(57) ABSTRACT

A method for hydrophilization and/or surface area enlargement of a porous base matrix comprising on its inner and/or outer surfaces a polymer (P') carrying nucleophilic groups X'. The method is characterized in
  (a) ethoxylating a plurality of said X' thereby transforming them to groups comprising —$(CH_2CH_2O)_nH$, or
  (b) (i) ethoxylating a polymer (P'') carrying nucleophilic groups X'' thereby transforming P'' to a polyhydroxy polymer (P''') carrying a plurality of —$(CH_2CH_2O)_nH$ groups, whereafter
    (ii) P''' is attached to the base matrix.
  n is an integer $\geq 1$.

A support matrix which is obtainable by the method. The support matrix has a sufficient rigidity and swellability to permit liquid flow of a velocity >5 cm/h through the matrix when in form of particles packed to a bed or in form of a porous monolithic plug.

The use of the support matrix defined in liquid chromatography, cell culturing, stepwise solid phase synthesis of organic molecules, affinity adsorption in suspensions, solid phase catalysis with an immobilized catalyst.

7 Claims, No Drawings ional patent application number PCT/EP2000/005193 filed Jun. 6, 2000, published on Dec. 14, 2000 as WO2000/075195 and also claims priority to Swedish patent application number 9902 133-9 filed Jun. 9, 1999; the disclosures of which are incorporated herein by reference in their entireties.

TECHNICAL FIELD

The present invention concerns surface modification comprising hydrophilization and/or surface area enlargement of a support matrix that comprises a base matrix (M) that on its surface exposes a polymer (P') to which nucleophilic groups are attached. The method means that at least part of the nucleophilic groups are transformed to groups comprising —$(CH_2CH_2O)_n$H. n is an integer >0 which may differ between different —$(CH_2CH_2O)_n$H groups in one and the same support matrix.

The instant invention is primarily concerned with support matrices that shall be used in affinity adsorption, such as liquid column chromatography. In this field of use the support matrix, typically in bed form, is subjected to a through-flowing liquid whereby solutes in the liquid are allowed to interact with groups on the matrix. The support matrix typically has been in form of populations of particles or monolithic plugs. Particles have been used in form of a packed bed or fluidised/expanded bed. In particular packed bed and monolithic bed format put demands on the matrix regarding swellability and rigidity. The term "column" refers to the vessel in which adsorption take place and can in principle have any three-dimensional geometric form.

BACKGROUND TECHNOLOGY

Similar support matrices have previously been manufactured for use in solid phase synthesis of organic compounds. See for instance Meldal, Meth. Enzymol. 289 (1997) 83-104; Barany et al., ACS Symp. Ser. 680 (poly(ethylene glycol) (1997) 239-264), Yoon-Sik et al (U.S. Pat. No. 5,466,758) and Bayer et al (U.S. Pat. No. 4,908,405). The materials in these matrices have typically been polystyrenes slightly cross-linked and derivatized to carry polyethylene glycol chains. Bayer et al (U.S. Pat. No. 4,908,405) suggests ethoxylation at any kind of nucleophilic group attached to a polystyrene, but for some unknown reasons Bayer et al prefer to start by grafting an oligoethylene chain to chloromethyl groups on the polystyrene. The key step of Yoon-Sik et al (U.S. Pat. No. 5,466,758) for producing this kind of material is to initially ethoxylate the ring thereby creating nucleophilic β-hydroxy groups that can be further ethoxylated. Bayer et al and Yoon-Sik et al limited their methods to matrices having a low degree of cross-linking (below 12%, with preference for 2-3%, of divinyl monomers in the polymerisation mixture). Nothing is said about selecting porous matrices in neither U.S. Pat. No. 4,908,405 nor U.S. Pat. No. 5,466,758. The low degree of cross-linking implies unfavourably swelling characteristics and a too low rigidity for liquid column chromatography.

Jones et al (U.S. Pat. No. 4,611,014) describe functionalization of macroporous supports obtained by polymerisation in high internal phase emulsions (HIPE, w/o emulsions). The base polymer material obtained from an HIPE emulsion is in form of a block and the use described is as liquid absorbents. The cross-linking degree is 1-20%, with preference for 2-10%, crosslinking monomer in the polymerisation mixture. One functionalization route is to introduce polyoxyalkylene groups, for instance by reaction of the polymer with polyoxyethylene anion or by reacting a hydroxy or carboxy functionalized form with ethylene oxide.

Li et al., (WO 9533553) describe beads obtained from w/o/w-emulsions and their use for (a) absorbing acids and aqueous solutions and (b) as substrates (support matrices) in chromatography, solid phase synthesis, cell culture and the like. The cross-linking degree is in the interval 1-90% cross-linking monomers. It is suggested to attach polyoxyalkylene groups to pore surfaces if the beads are to be used for absorbing aqueous liquids.

In U.S. Pat. No. 4,611,014 and WO 9533553 polyoxyalkylene groups may be end-derivatized with a cation exchanging group (—COO$^-$, or (—OSO$_2$O$^-$).

Membranes made of ethoxylated non-cross-linked condensation polymers such as polyamides and polyurethanes have been described in U.S. Pat. No. 3,472,766.

Cross-linking degree is one of many variables that determine rigidity and swellability. The concept of cross-linking is many times not well defined and is often difficult to measure. Therefore support matrices to be used in connection with column chromatography are in stead characterized as their ability to withstand pressure when a liquid is allowed to pass through a packed bed of support matrix particles or through a porous monolith of the support matrix.

Liquid column chromatography, cell culturing, stepwise solid phase synthesis of organic molecules, affinity adsorption in suspensions, solid phase catalysis with immobilized catalysts (e.g. enzymes) etc often require that substances more or less selectively or specifically shall bind/adsorb to groups on the surface of a support matrix. A high binding capacity is often preferred. The substances typically are present in aqueous liquid media. This is contrary to pure absorbents that just shall be good in absorbing large amounts of liquids, for instance water.

OBJECTS OF THE PRESENT INVENTION

A first object is to provide a simple method for the manufacture of a porous support matrix having its liquid interacting surface area hydrophilised and/or enlarged by introducing —$(CH_2CH_2O)_n$H groups by ethyloxylation of the inner and/or outer surfaces of a starting base matrix.

A second objective is a a simple method for increasing equilibrium break through capacity (Qeq) and dynamic capacity (QB) of the kind of base matrices defined above.

A third object is to provide improved porous and/or rigid support matrices having an enlarged surface by introduction of —$(CH_2CH_2O)_n$H groups (compared to a starting base matrix).

A fourth object is to provide improved methods for affinity adsorption and liquid chromatographic techniques.

THE INVENTION

The present inventors have recognized that support matrices for the uses discussed above can be better optimized in case polyoxyethylene groups are created in situ by reaction with ethylene oxide compared to attaching more or less ready-made polyoxyethylene groups. The rationale behind this idea is that ethylene oxide is a small molecule permitting close packing on a surface while larger groups, such as polyoxyethylene groups, once attached will create a more pronounced steric hindrance for subsequently incoming polyoxyethylene polymer molecules. This effect will influence the hydrophilic/hydrophobic balance of the surface obtained and the surface enlargement provided by the attached polyoxyethylene groups.

A first aspect of the invention is a method for hydrophilization and/or surface area enlargement of a porous base matrix comprising on its inner and/or outer surfaces a polymer (P') carrying nucleophilic groups X'. The method is characterized in a) ethoxylating a plurality of said X' thereby transforming them to groups comprising —($CH_2CH_2O)_n$H, or
b) (i) ethoxylating a water-soluble polymer (P''') carrying nucleophilic groups X'' thereby transforming P''' to a polyhydroxy polymer (P'''') carrying a plurality of —($CH_2CH_2O)_n$H groups, thereafter
(ii) attaching P'''' to the support matrix.

n is an integer $\geq 1$ often selected to be in the interval 1-1000, such as $\geq 2$, $\geq 3$ or $\geq 5$. n may vary between different groups on the same support matrix. The upper limit for n typically corresponds to a mean Mw of 45-50,000 dalton of the introduced —($CH_2CH_2O)_n$H groups.

Ethoxylation

Polymerisation of alkylene oxides has been practised for over a century [A. Wurtz, Ann. Chim. et Phys. 69 (1863), 317]. Today, polymerisation of ethylene oxide from a substrate, commonly referred to as ethoxylation, is a well-known concept. The over-all reaction may be divided into different steps. First an ionized nucleophilic group (X) reacts with ethylene oxide in a ring-opening reaction of the oxirane ring. In the polymerisation step, ethylene oxide is repeatedly added to the product from the initiation step [R. W. Body et al. in Encyclopedia of polymer science and engineering, John Wiley & Sons, Inc. 1986, R. H. Whitmarsh, in Non-ionic Surfactants: Polyoxyalkylene Block Copolymers, Ed. V. M. Nace, Marcel Dekker, New York, 1996]. The molecular weight distribution of the formed polymer chains depends on the reactivities of the various growing species. In case several nucleophilic groups are present in the reaction mixture n will be a mean value for a spectrum of —($CH_2CH_2O)_n$H groups. This reaction scheme can be applied to the base matrix comprising P' carrying nucleophilic groups X' or to a polymer (P''') carrying nucleophilic groups X'', i.e. according to alternative (a) or (b) above.

X' and X'' may be selected among nucleophilic groups that has in common that they have a heteroatom with free pair of electron (nitrogen, oxygen and sulphur). Examples of nucleophilic groups are: carboxylic acid (—COOH), amine (—$NR_1$H), amide (—$CONR_2$), hydroxyl (—OH), mercaptan (—SH) etc. Amine (primary and secondary), amide (from a primary amine), and hydroxyl groups (primary and secondary alcohol and phenol) are preferred. Phenolic hydroxyl or primary hydroxyl groups are particularly preferred because they can result in —($CH_2CH_2O)_n$H groups of narrow molecular weight distribution. This kind of groups also gives particularly stable ether bonds. $R_1$ and $R_2$ are selected among hydrogen, alkyl (straight, branched or cyclic alkyl, preferably $C_{1-6}$ alkyl), and —($CH_2CH_2O)_m$H with m being an integer that typically is $\geq 1$ with preference for being in the interval 1-1000. For amine and amide, $R_1$ and $R_2$ may also be a link to a monomer unit in P' or P''', i.e. secondary amine groups and the amide groups (from primary amines) may be part of the polymer chain in P' or P'''.

In the preferred variants of the first aspect of the invention, X' and X'' are not hydroxyl groups introduced by pregrafting an oligoethylene glycol chain (—($CH_2CH_2O)_{n'}$H to the base matrix. n' is an integer $\geq 1$, for instance $\leq 10$.

During ethoxylation the nucleophilic groups X' and X'' will be transformed to a linking structure L ($L'_{P'}$ and $L''_{P'''}$ respectively) comprising the nucleophilic heteroatom of X' and X''. $L'_{P'}$ and $L''_{P'''}$ will be (a) —O— (ether) when X' or X'' is hydroxy,
(b) —$NR_1$— (amine) when X' or X'' is amine), and
(c) —$CONR_2$— (amide) when X' and X'' is amide (—$CONHR_2$). One valence binds directly to P' or P''' and the other directly to —($CH_2CH_2O)_n$H. $R_1$ and $R_2$ are selected among the same groups as above.

By the appropriate choice of the reaction conditions (reaction temperature, solvent, catalyst, substrate etc), side-reactions such as degradation, cross-linking and formation of homo-poly(ethylene glycol) may be minimised. The reaction temperature is preferably selected in the interval 20-160° C. The reaction is typically allowed to proceed for 10 minutes up to several hours. The solvent is preferably aprotic in order to avoid hydrolytic side reactions. Suitable solvents are aprotic, for instance ethers such as dioxane, tetrahydrofuran and diglycol ethers. Other solvents that can be used are toluene, benzene, xylene, dimethyl formamide, and dimethyl sulfoxide. The reaction is optionally carried out in the presence of alkaline or acidic catalysts. Suitable alkaline catalysts are, for example, alkali metals, such as lithium, sodium, or potassium; hydroxides, alkoxides and organometallic compounds. Suitable acidic catalysts are, for example, hydrogen chloride, sulphuric acid, or p-toluene sulphonic acid.

The reaction conditions are preferably selected so that n becomes an integer between 1-1000, such as $\geq 2$, $\geq 3$ or $\geq 5$, in a support matrix according to the invention. n may vary between different —($CH_2CH_2O)_n$H groups on the same support matrix. The upper limit given for n corresponds to a mean Mw of 45-50,000 dalton.

Base Matrix

The base matrix may be in form of a population of porous and non-porous particles or a porous monolithic plug. The particles may be spherical (beads).

The polymer P' may constitute the major component of the base matrix. In an alternative variant, the base matrix may be an open porous core material coated on its inner and/or outer surfaces by polymer P'. The core material may be polymeric and/or of inorganic or organic origin.

Polymer P' may be a polymer obtained by polymerising one or more different monomers containing an alkene group, for instance vinyl monomers. Acrylates, methacrylates, acrylonitriles, methacrylonitriles, acrylamides, methacrylamides, vinylbenzenes, vinyl ethers, vinyl esters etc are typical examples of this kind of polymers. One way of introducing cross-links is to include monomers comprising two or more alkene groups in the polymerisation mixture (cross-linking monomer).

For base matrices consisting essentially of a vinyl polymer, the polymer should according to the invention have been obtained by polymerising a mixture of polymerisable monomers in which >12%, such as $\geq 15\%$ (w/w) or $\geq 20\%$ (w/w) of the monomers have two or more alkene groups. The preferred base matrices of this kind are based on polymerisation mixtures in which the cross-linking monomer constitutes 15-85% (w/w), such as 20-70% (w/w) of the monomers.

Polymer P' may also be a biopolymer or a polymer derived from a biopolymer. Carbohydrates, such as dextran, starch, cellulose, agarose etc in appropriately derivatised form, are typical examples.

Polymer P' may also be a polymer obtained by polymerising monomers carrying two or more nucleophilic/electrophilic groups. Polymers in which the monomeric units are linked to each other via ether (—O—), thioether (—S—) or amide (—CONHR$_3$) are examples (R$_3$ is selected among the same groups as R$_1$ and R$_2$). In these variants cross-links can be introduced by inluding monomers carrying three or more nucleophilic/electrophilic groups.

In all polymers cross-links may be introduced also subsequent to the polymerisation step.

Porous glass (polymer) and porous zirkonium oxide are examples of suitable inorganic base matrices.

The selection of particle sizes and pore volumes and pore sizes are done according to principles that are well known in the field.

The preferred particle populations typically have a mean diameter in the range of 1-1000 μm. Particle populations can be monodisperse or polydisperse. By the term "a monodisperse population" is contemplated a population of particles in which at least 95% of the particles are within the mean size of the population ±5%.

The optimal pore sizes for both particles and monolithic plugs are typically found in the interval 100 Å-1000 μm, most often 100 Å-10 μm or 10 Å-100 μm. The optimal pore volume is typically found in the interval 10-99%, with preference for 20-95%. The figures refer to values being measured by mercury intrusion porosimetry or inverse size exclusion chromatography.

The base matrix should have a swellability and rigidity such that the matrix in form of particles backed to a bed or in form of a porous monolithic bed permit liquid flow of a velocity of ≧5 cm/h to pass through the bed. In preferred variants the lower limit is ≧15 cm/h, such as ≧50 cm/h. The upper limit is dependent on the amount and kind of material in the base matrix, cross-linking degree, kind of liquid etc. If the rigidity and swellability is too low and the flow velocity is selected too high for a particular matrix, the matrix and/or the bed will collapse. Normally the upper limit is always ≦3000 cm/h. Matrices often will be gradually compressed during a prolonged use meaning that the upper limit may be changed by "ageing". The matrices (in a packed bed format or a monolithic format) should be able to withstand the applicable liquid velocity for at least one hour. The liquid may be selected among those liquids that are used as mobile phase in liquid chromatography. See below.

Polymer P'''

Polymer P''' may in principle be any one of the above-mentioned kind of polymers P' provided that it exhibits a plurality of the nucleophilic group X'' reactive with ethylene oxide. X'' is selected according to the principles given under the heading "Ethoxylation". Thus the preferred polymer P''' is selected among polyhydroxy polymers, polyamine polymers and polyamide polymers By ethoxylation the polymer P''' is transformed to a polyhydroxy polymer (P''''), typically soluble in water. See Derand et al., J. Polym. Sci. Part A: Polym. Chem. 36(5) (1998) 803-.

Subsequent to ethoxylation, P'''' is immobilised to the base matrix. Introduced hydroxy groups, remaining X'' groups or other functional groups (Z'') present in P'''' and not possible to ethoxylate may be utilised for immobilising P'''' to P' at nucleophilic groups X' or at some other functional groups (Z') in P'. In case both P' and P'''/P'''' carry hydrophobic groups, P'''' may be attached to P' by hydrophobic adsorption. Typical hydrophobic groups are hydrocarbyls, including alkyls, aryls such as phenyls, Other Groups that may be Introduced onto the Novel Support Matrix After Ethoxylation.

The OH groups of —(CH$_2$CH$_2$O)$_n$H groups or any remaining functional group X' and Z' or X'' and Z'' may be employed for introduction of additional functionalities. These additional functionalities are known per se in the various fields of use of the instant invention and include also functionalities that may be developed in the future.

One kind of functionality is based on affinity binding (affinity adsorption) and is best represented by a member of an affinity pair. Well-known affinity pairs are (a) positively and negatively entities (ion exchange; the immobilised entity being selected among primary, secondary, tertiary and quaternary ammonium, sulphonate, sulphate, phosphonate, phosphate, carboxy etc groups),
(b) antibodies and antigens/haptens,
(c) lectins and carbohydrate structures,
(d) IgG binding proteins and IgG,
(e) pair of hydrophobic groups,
(f) polymeric chelators and chelates,
(g) complementary nucleic acids,
(h) cells and cell binding ligands, etc.

Affinity members also include entities participating in catalytic reactions, for instance enzymes, enzyme substrates, cofactors, cosubstrates etc. An affinity member may also be synthetic mimetics of bioproduced affinity members.

Accordingly, one or more of the remaining functional group X' and Z' or X'' and Z'' may have been transformed to a group -A-Y, where A is an organic spacer structure selected as known in the respective field and Y is any of the above-mentioned functionalities and/or groups.

The second aspect of the invention is a support matrix comprising a base matrix (M) that on its surface exposes a polymer (P') having nucleophilic groups X' that have been transformed to -L-(CH$_2$CH$_2$O)$_n$H groups where n is an integer ≧1, and L is a linker structure. The support matrix is characterized in that A. the -L-(CH$_2$CH$_2$O)$_n$H groups have been introduced
   (a) by ethoxylating X' groups of the base matrix (M);
   (b) by ethoxylating a polymer (P''') carrying nucleophilic groups X'' whereafter the so obtained polyhydroxy polymer (P'''') has been attached to the base matrix (M),
B. the base matrix is porous and/or nonporous;
C. the base matrix in form of particles packed to a bed or in form of a porous monolithic bed have a sufficient rigidity and swellability to permit liquid flow of a flow velocity ≧5 cm/h to pass through the bed, typically <3000 cm/h.

Both the support matrix and the base matrix are preferably porous.

In the second aspect of the invention, the base matrix, P', P'', P''', Z', Z'', X' and X'', —(CH$_2$CH$_2$O)$_n$H, L, L'$_{P'}$, L''$_{P'''}$, n and -A-Y can in principle be selected as outlined for the first aspect of the invention.

The demands on the support matrix to permit liquid flow to pass through the matrix (packed bed and porous monoliths) are as outlined above for the base matrix.

A third aspect of the invention is the use of the instant support matrices in liquid column chromatography. The liquids concerned (mobile phases) are often aqueous containing various buffers and salts. The liquid may also be organic, such as acetone, methanol, ethanol, propanol, isopropanol, acrylonitril, tetrahydrofuran etc and mixtures thereof and/or with water. The liquid velocities are typically ≧5 cm/h, for instance ≧15 cm/min or even ≧50 cm per hour. With the base matrix materials available today, the upper limit for liquid velocities is typically ≦3000 cm/h. The support matrices may be in the form of particles packed to a bed or in form of an expanded bed or in the form of a porous monolithic plug.

In spite of their increased rigidity the present inventive support matrices may also find uses in fields other than liquid column chromatography. Such other uses may be cell culturing, stepwise solid phase synthesis of organic molecules, affinity adsorptions in suspensions, solid phase catalysis with immobilized catalysts (e.g. enzymes).

The invention will now be illustrated by non-limiting examples. The invention is defined in the attached patent claims.

EXPERIMENTAL PART

EXAMPLE 1

Ethoxylation of Porous, Hydroxy Functional Polymer Matrix.

Porous poly(acetoxy styrene-co-divinyl benzene) (AcS/DVB) matrix material was prepared by copolymerisation of acetoxystyrene (1 mL) and divinylbenzene (1 mL) using 2-methyl-4-pentanol (2 mL) as porogen and 50 mg V-65 (WAKO) as initiator. The reaction mixture was kept at 60° C. for 20 h, and the resulting matrix was extracted by excess of acetone. 0.1 g potassium hydroxide was dissolved in 6 mL methanol and then transferred together with 4 mL di(ethylene glycol) diethyl ether and 1.5 g AcS/DVB to a glass container. The container was sealed and left for 15 h at 50° C. The resulting polymer was washed by 5×10 mL of methanol, and then dried.

1 g hydrolysed AcS/DVB and 80 mL dimethyl sulfoxide were transferred to a stainless steel reactor. The reactor was further equipped with an injection port, a stirrer, a gas inlet/outlet, a thermocouple, and a pressure transducer. The solution was then degassed several times. The reaction mixture was thereafter heated to 80° C. and the reactor evacuated. By opening the inlet valve, 3 g ethylene oxide was distilled over to the reactor. The reaction was allowed to proceed until the pressure had dropped to the same value as before addition of ethylene oxide. The ethoxylated AcS/DVB (EO-AcS/DVB) particles were transferred to water, hydrochloric acid was added to neutralise the solution, and the particles were washed with excess of water.

EXAMPLE 2

Preparation of Ethoxylated Poly(Vinyl Alcohol) (Eo-PVA)

Potassium-tert-butoxide (3.7 g) was dissolved in 100 mL dimethyl sulfoxide. 30 g poly(vinyl alcohol) ($M_w$ 13 000-23 000) was then added and allowed to dissolve. The solution was thereafter transferred into to reactor (see example 1) and degassed several times. The reaction mixture was then heated to 80° C. and the reactor evacuated. By opening the inlet valve, 30 g ethylene oxide was distilled over to the reactor. The reaction was allowed to proceed until the pressure had dropped to the same value as before addition of ethylene oxide.

EXAMPLE 3

Coupling of EO-PVA to Sepharose 6 FF (EO-PVA-FF) and Testing Utilising Chromatography Beads of Sepharose 6FF (50 g) (Amersham Pharmacia Biotech, Uppsala, Sweden), water (30 ml), sodium hydroxide (NaOH) (6,5 g) and sodium borhydride (0,1 g) were mixed in a container at 30° C. Thereafter epichlorohydrine (12 ml) was added. After two hours, acetic acid was added until neutralisation of the reaction mixture was obtained. The resulting gel (epoxFF) was washed with water. EO-PVA (8 g) and water (30 ml) heated to 30° C., whereafter epoxFF (40 g) was added. Thirty minutes later, NaOH (6,6 g) and sodium borhydride (0,2 g) were transferred to the container and the reaction was left overnight. Acetic acid was added until neutralisation was obtained.

Gel filtration of EO-PVA-FF (using ferritin, BSA and R-nase) gave a decrease of the $K_{av}$ values as compared to Sepharose 6FF (see Table I). The injection volume is 50 μm and detection is carried out at 280 nm.

TABLE I

|  | Mw | $K_{av}$ Sepharose 6FF | $K_{av}$ EO-PVA-FF |
| --- | --- | --- | --- |
| Ferritin | 440 000 | 0.59 | 0.45 |
| BSA | 67 000 | 0.73 | 0.64 |
| R-nase | 13 700 | 0.90 | 0.85 |

EXAMPLE 4

A. Derivatization of EO-PVA-FF

EO-PVA-FF (40 g) and glycidyl trimethylammonium chloride (200 ml) was mixed and left for 30 minutes at 30° C. Thereafter was NaOH 50 w/w % (6 ml) added. The mixture was left overnight and was then neutralized with acetic acid. The resulting gel (Q-EO-PVA-FF) was then washed with water.

B. Frontal Analysis with BSA

Frontal analysis with BSA was performed at a liquid velocity of 300 cm/h, using 50 mM TRIS (pH 8) as mobile phase (addition of 1.0 M NaCl was used for eluation). Sample loading was carried out continuously until the sample concentration in the eluate reached above 95% of its original value. Detection is carried out at 280 nm. The equilibrium break through capacity (Qeq) and the dynamic capacity at 10% break through capacity, referred to as QB10%, was measured (see Table II).

TABLE II

|  | Qeq (mg/ml) | QB10% (mg/ml) |
| --- | --- | --- |
| Q-Sepharose 6FF | 79 | 38 |
| Q-EO-PVA-FF | 108 | 100 |

EXAMPLE 5

Hydrophobicity/Hydrophilicity Test Based om Column Chromatography

A column was packed with 1 ml EO-AcS/DVB (see example 1) and then equilibriated by 15 column volumes (water). Thereafter was 10 μM testosterone propionate (Tpr) solution injected (10 mM Tpr in methanol). A gradient elution is then carried out: 0% acetonitrile (ACN) to 95% ACN in 70 minutes at a flow rate of 1 ml/minute. Results are shown in Table II. Detection is carried out at 240 nm.

TABLE III

|  | Retention (% ACN) |
|---|---|
| AcS/DVB | 47 |
| EO-AcS/DVB | 27 |

Having described the particular, desired embodiments of the invention herein, it should be appreciated that modifications may be made therethrough without departing from the contemplated scope of the invention. The true scope of the invention is set forth in the claims appended hereto.

The invention claimed is:

1. A method for hydrophilization and/or surface area enlargement of a porous base matrix comprising on its inner and/or outer surfaces a polymer (P''') carrying nucleophilic groups X'', comprising:
   (i) ethoxylating a polymer (P'') carrying nucleophilic groups X'' thereby transforming P'' to a polyhydroxy polymer (P''') carrying a plurality of $-(CH_2CH_2O)_nH$ groups, and thereafter
   (ii) P''' is attached to the base matrix; wherein n is an integer $\geq 1$.

2. The method of claim 1, wherein X'' is selected from the group consisting of hydroxyl groups (—OH), and amine groups (—NHR$_1$), and amide groups (—CONHR$_2$) in which the free valence binds to P''' and R$_1$ and R$_2$ are independently selected among, hydrogen, alkyl, a bond to a monomer unit in P''', alkyl, and —(CH$_2$CH$_2$O) mH with m being an integer $\geq 1$ 3. The method of claim 1, wherein X'' is selected from the group consisting of phenolic hydroxyl groups, primary and secondary alcoholic hydroxyl groups, primary and secondary amine groups and amide groups.

4. The method of claim 1, wherein the base matrix includes a vinyl polymer which has been obtained by polymerisation of a mixture of monomers in which more than 12% by weight of the total amount of polymerisable monomers are monomers having two or more vinyl groups.

5. The method of claim 1, wherein the polymer P'' is a copolymerisate of one or more compounds having one vinyl group and one or more compounds having two or more vinyl groups.

6. The method of claim 1, wherein the base matrix is in form of a population of particles in a packed bed or in the form of a porous monolithic plug that will permit a liquid flow to pass through at a liquid velocity >5 cm/h.

7. The method of claim 1, wherein the X'' groups of the P'' polymer are ethoxylated.

* * * * *